Figures 3, 4:
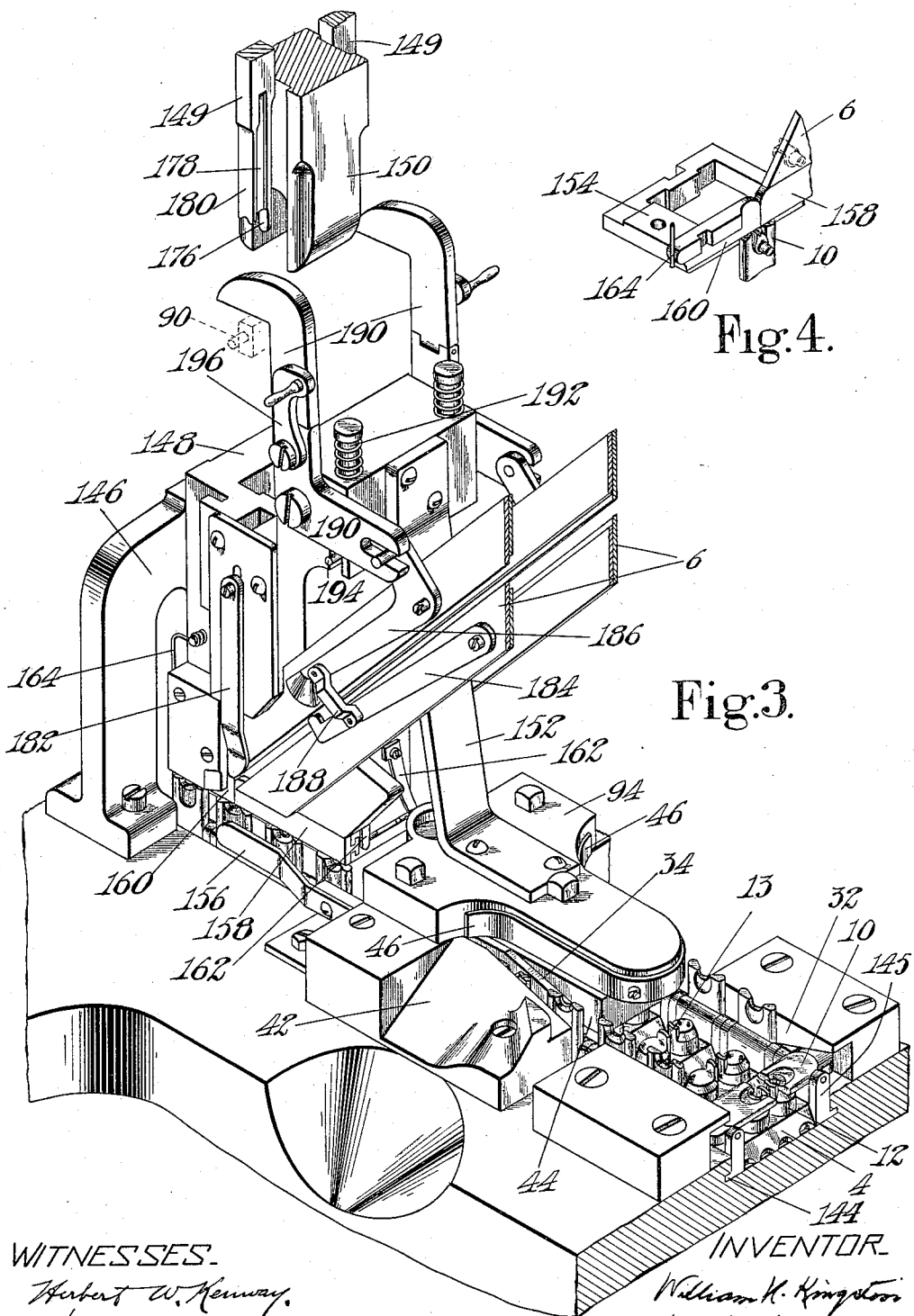

W. H. KINGSTON.
MANUFACTURE OF CELLULOID COVERED ARTICLES.
APPLICATION FILED JAN. 4, 1912.
1,164,821.
Patented Dec. 21, 1915.
5 SHEETS—SHEET 1.
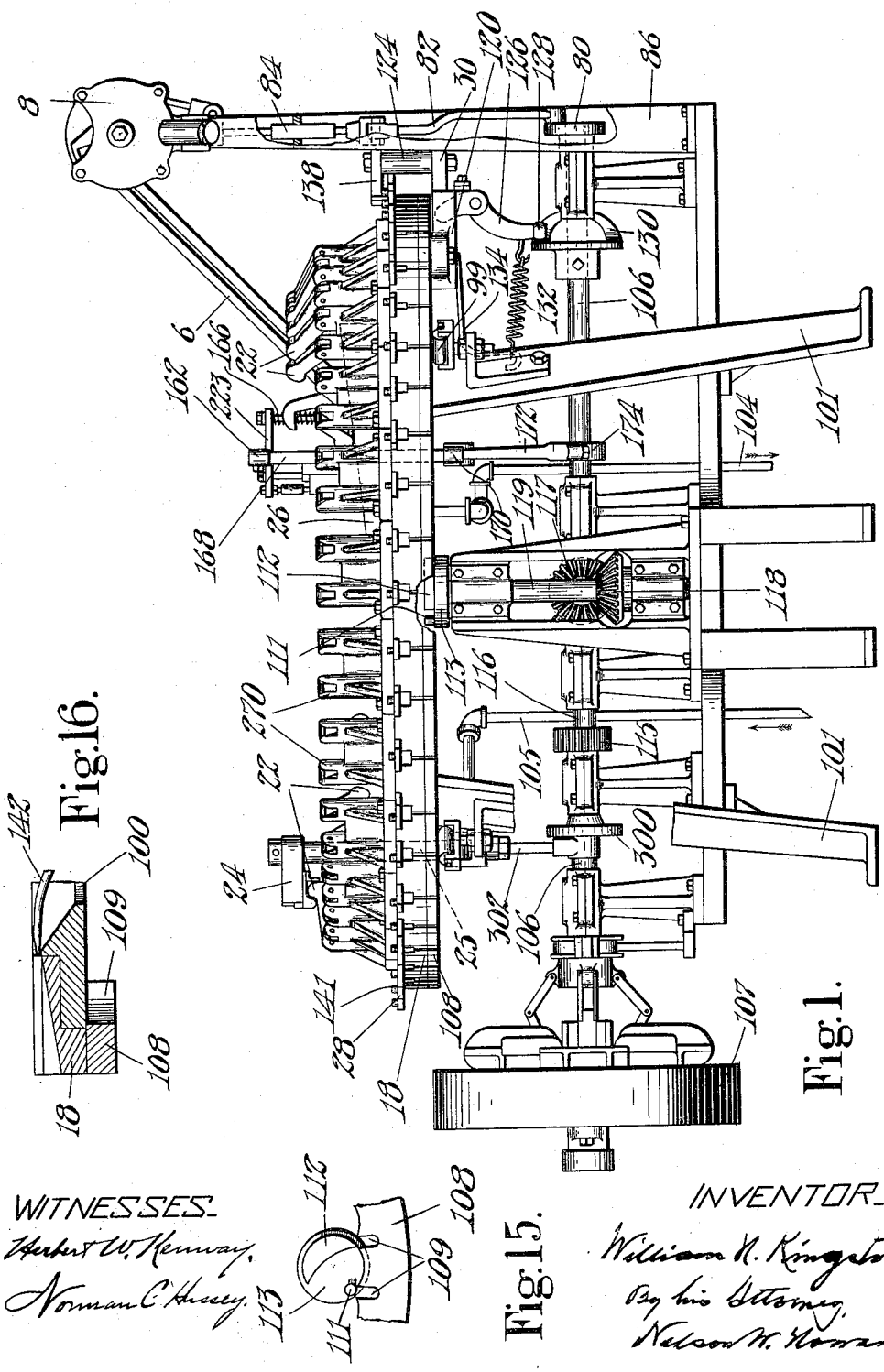

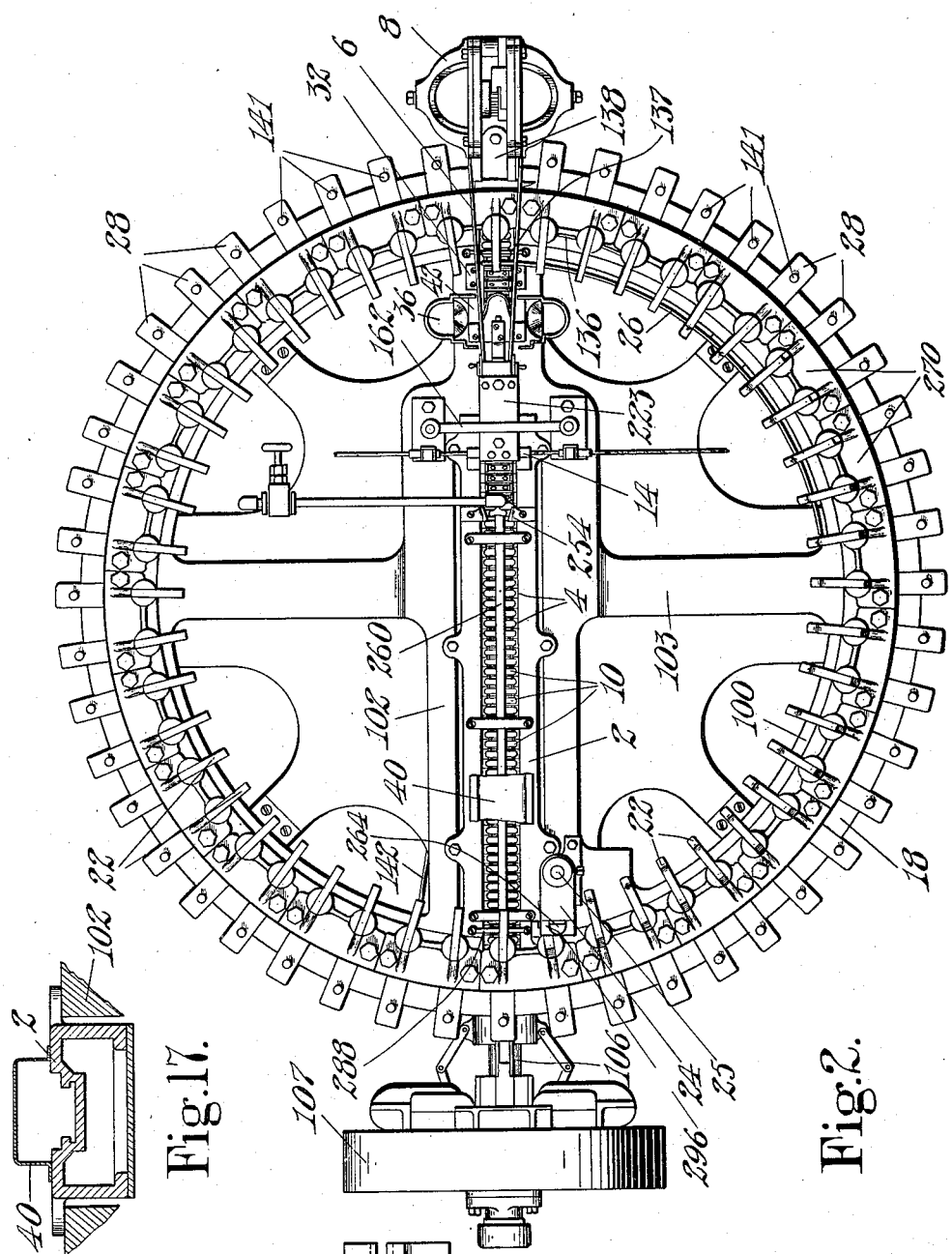

W. H. KINGSTON.
MANUFACTURE OF CELLULOID COVERED ARTICLES.
APPLICATION FILED JAN. 4, 1912.

1,164,821.

Patented Dec. 21, 1915.
5 SHEETS—SHEET 3.

WITNESSES.
Herbert W. Kenway.
Norman C. Hussey.

INVENTOR.
William H. Kingston
By his Attorney
Nelson W. Howard

COLUMBIA PLANOGRAPH CO., WASHINGTON, D. C.

W. H. KINGSTON.
MANUFACTURE OF CELLULOID COVERED ARTICLES.
APPLICATION FILED JAN. 4, 1912.
1,164,821.
Patented Dec. 21, 1915.
5 SHEETS—SHEET 4.
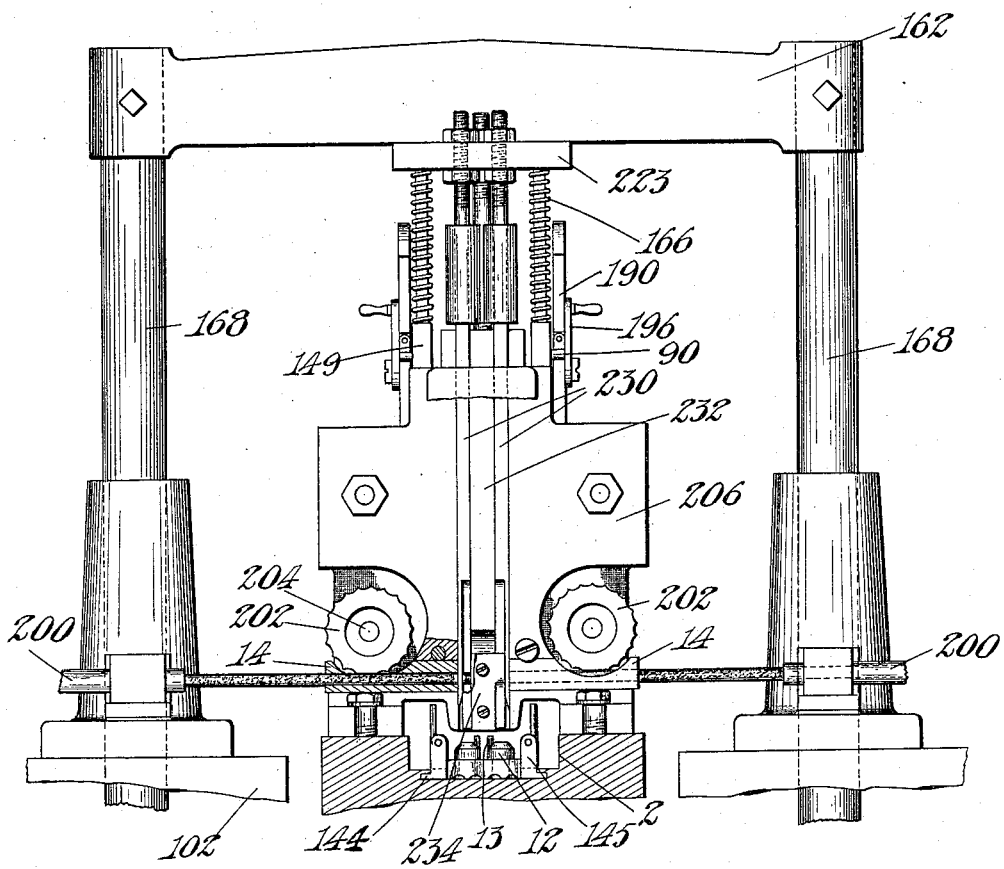
Fig. 5.
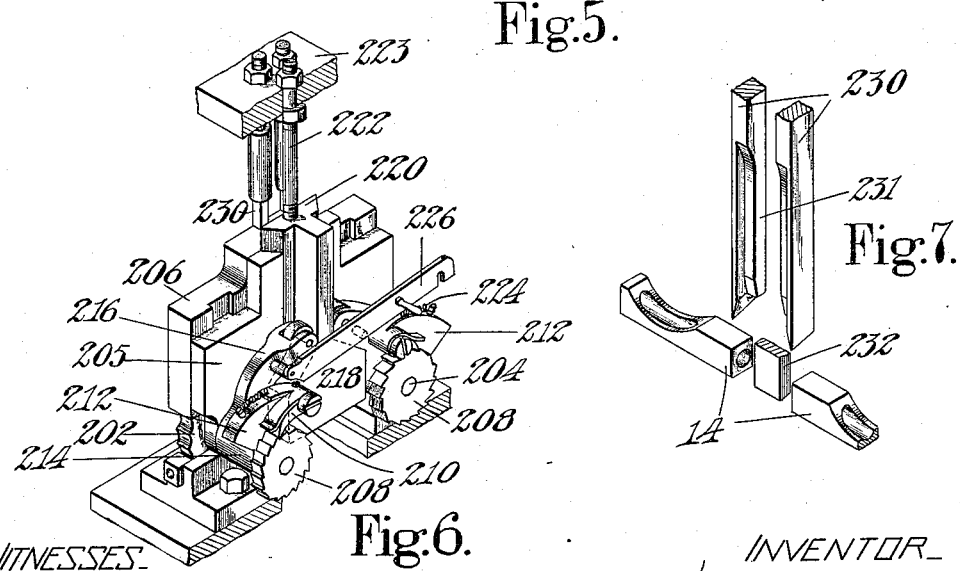
Fig. 6.
Fig. 7.
WITNESSES
Hubert W. Kenway
Norman C. Hussey
INVENTOR
William H. Kingston
By his Attorney

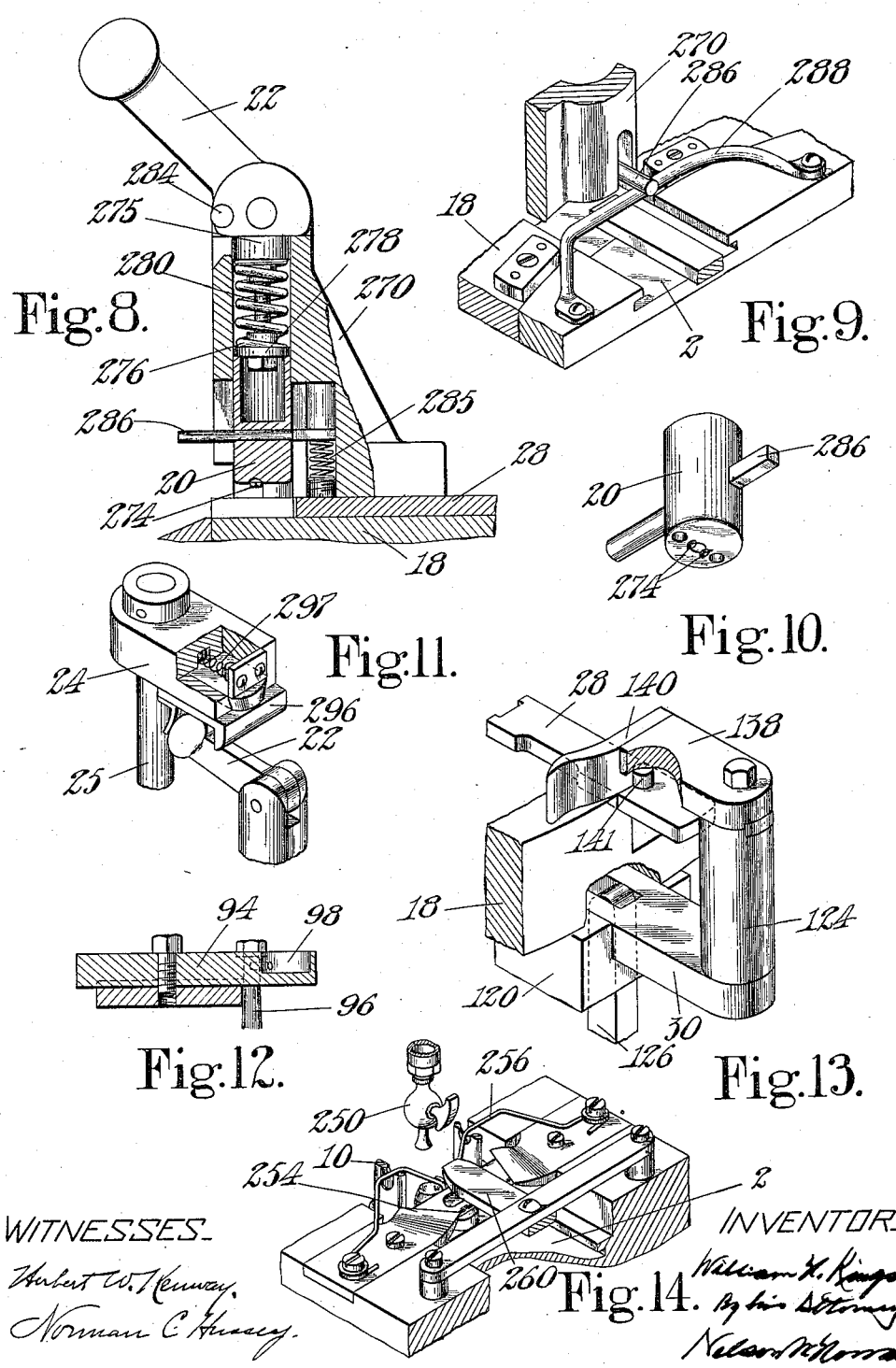

UNITED STATES PATENT OFFICE.

WILLIAM H. KINGSTON, OF NEW HAVEN, CONNECTICUT, ASSIGNOR TO S. O. & C. CO., OF ANSONIA, CONNECTICUT, A CORPORATION OF CONNECTICUT.

MANUFACTURE OF CELLULOID-COVERED ARTICLES.

1,164,821.	Specification of Letters Patent.	Patented Dec. 21, 1915.

Application filed January 4, 1912. Serial No. 669,455.

*To all whom it may concern:*

Be it known that I, WILLIAM H. KINGSTON, a citizen of the United States, residing at New Haven, in the county of New Haven and State of Connecticut, have invented certain Improvements in the Manufacture of Celluloid - Covered Articles, of which the following description, in connection with the accompanying drawings, is a specification, like reference characters on the drawings indicating like parts in the several figures.

This invention relates to the art of covering articles with celluloid or other pyroxylin material which is capable of being rendered flexible or plastic so that it may be shaped about and united to the surface of the article, or the part of the article, which is to be covered.

The invention is herein illustrated as applied to the manufacture of covered lacing hooks, although many of its features are capable of a more general application.

In one of its important aspects the present invention comprises a novel method of covering articles with celluloid. The invention also includes within its scope a machine whereby this novel method may be practised in a satisfactory manner upon a commercial scale, but the machine may be used in the practice of other methods than that herein disclosed, while the method itself may be carried out by the use of machines or apparatus of many different types as will be apparent to those skilled in the art.

One object of the invention is to provide a machine which shall be capable of continuous and automatic operation and which shall require little attention on the part of the attendant beyond supplying in bulk the articles to be covered and the celluloid to constitute the covering.

To this end an important feature of the invention consists in the combination of a pair of coöperating dies with mechanism for feeding a metallic blank and a blank of plastic material to the dies, means for heating the dies, for applying pressure to them and for releasing the pressure after the dies have sufficiently cooled.

The invention is herein shown as embodied in a machine for covering lacing hooks with celluloid and for convenience the articles to be covered are hereinafter referred to as metallic blanks and the covering material is referred to as celluloid although, as has already been stated, the invention is capable of adaptation for covering a variety of articles with celluloid or other plastic material.

Another important feature of the invention consists in the combination with a number of coöperating dies of mechanism for moving the dies in an endless path and for successively supplying to said dies during their movement in such path a metallic blank and also a plastic blank.

In a preferred embodiment of the invention the dies are moved along a heated guideway, which constitutes part of their path, until the celluloid is sufficiently heated. They are then moved along another portion of the path in which movement they are subjected to pressure, cooled and released from pressure.

In the embodiment of the invention herein shown a series of molds comprising one or more pairs of coöperating dies are arranged for movement along a straight guideway which is disposed as the diameter of a carrier ring having sockets arranged to receive successive molds from one end of the guideway and carry them one by one to the other end of the guideway. During the movement of the molds along the guide-way the metallic blanks are supplied and then plastic blanks are supplied, and the molds are heated. During their movement in the carrier ring the molds are subjected to pressure and carried while under pressure along a path sufficiently extended to permit them to cool. The pressure is then released and the dies reintroduced into the straight guideway where the finished hooks are ejected. This arrangement broadly constitutes an important feature of the machine and renders possible the desired uninterrupted and continuous cycle of operations. As will be apparent hereinafter the separate steps of the method are so related that they may be performed to the best advantage when each individual mold occupies successively progressing positions in its endless path.

Another object of the invention is to provide a machine of the class described which shall be adapted for receiving its supply of celluloid or other plastic material in the form of a continuous strip, wire or rod rather than in the form of previously prepared pellets. It is believed that it has not heretofore been found practical to utilize celluloid in this form in a covering applying machine. It will be apparent that such a machine possesses many advantages in point of simplicity of organization and operation over a machine in which it is necessary to provide magazines, raceways and transferring mechanism for celluloid pellets.

An important feature of the invention consists broadly in the provision of mechanism for feeding a celluloid rod or wire, cutting it into pieces of suitable size and delivering the pieces so cut successively to forming dies.

Other features of the invention relate to feeding and cutting off mechanism for the celluloid rod or wire, examples of which mechanisms are disclosed specifically hereinafter. As herein shown, the celluloid rod or wire is fed through a passage disposed at an angle to the path of a cutting off knife and is advanced by a toothed wheel which is disposed with its periphery extending into the passage so as to engage the celluloid between itself and the opposite side of the passage. For convenience in handling celluloid rods of different diameters the feed wheel and guiding passage are preferably arranged for adjustment relatively to each other. Feeding mechanism of this kind has proved reliable and accurate in operation and admirably suited to the performance of its function. That feature of the invention which relates to the cutting mechanism consists in providing a member having a shearing blade and a transferring rib or bar, the shape of the blade being such as to shift the rod into alinement with the transferring bar during the cutting operation and being beveled on the side toward the end of the rod. A cutting device of this character operates to sever a piece from the end of the rod cleanly and without tendency to break the rod and it is also an advantageous construction in that it presents a simple and effective transferring device for carrying the severed end of the celluloid rod to the mold to be supplied.

The invention also includes a new and improved mechanism for feeding hook blanks from the mass contained in a hopper and delivering them singly to the successive forming dies. As herein shown one member of each pair of dies is arranged to be moved beneath the delivery end of a raceway in such position as to receive a hook blank with its barrel disposed horizontally. A pair of guiding plates are arranged end to end between the delivery end of the raceway and the die and retain each hook blank as it is released from the raceway, maintaining it in position to be engaged and forced between the ends of the guiding plates to its seat on the die by a reciprocatory transferring plunger. By this construction a positive and accurate handling of the hook blanks is insured and moreover the operation of this transferring mechanism is not interrupted or interfered with by any ordinary variations in the dimensions of the hook blanks encountered.

The operation of the transferring mechanism is rendered more certain and precise by its combination with devices for locating the die to receive the hook blank in exact alinement with the transferring plunger and such combination constitutes another feature of the invention.

As has already been stated, the hook covering process is carried out as a continuous operation, its successive steps being performed while the dies occupy successive positions in an endless path. The metallic blank feeding mechanism and the celluloid feeding and cutting off mechanisms constitute some of the instrumentalities which effect successive steps in the process at different points in the path of the molds. While these instrumentalities in themselves constitute important features of the invention their combination and coöperation in an organized machine also constitute an important feature of the invention, and the same is true of each of the other instrumentalities which operate at subsequent points in the path of the molds.

After the molds have been supplied with blanks they are advanced through a chamber filled with steam above a heated guideway. The combination of such a chamber with molds, blank supplying mechanism and mold feeding mechanism constitute another important feature of the invention. The advantages of this construction as a means for heating and softening celluloid are apparent but it has particular advantage in the present combination in that it lends itself particularly well to the requirements of the process to be carried out and coöperates to a good advantage with the other instrumentalities of the machine.

The construction of the carrier ring and its supporting and feeding mechanism constitute another feature of the invention which contributes largely to the smooth and successful operation of the machine as a whole. The weight of the carrier ring is distributed, so as to avoid excessive friction, partly upon a stationary support and partly upon a number of separated roller bearings and an intermittent rotary movement is imparted to the ring by feeding means acting simultaneously at diametrically opposite points.

Other features of the invention relate to the devices for subjecting the molds to pressure and holding them under pressure until the molding operation has been effected. As herein shown, pressing plungers are arranged to be depressed upon the molds by eccentric levers which operate through suitable cushioning devices to exert a predetermined pressure upon the molds and are locked in a position of pressure. This construction is important in that it insures a uniform treatment of each article covered, a factor which contributes to uniformity of product.

While the advantages of the other instrumentalities of the machine, for example the pressure actuator for the mold plungers, the mold feeding mechanism, mold cleaning mechanism, the devices for separating and closing the separate dies of the mold, etc., are not enumerated at this point, it should be understood that each of these instrumentalities possesses qualifications and advantages by reason of which it is particularly adapted for use in the present organized machine, and that, further, each of these instrumentalities in itself comprises a new and useful device or appliance which may be embodied to good advantage in covering applying machines of a different type from the machine herein disclosed.

The novel method, for the practice of which the machine herein described may be used to a good advantage, consists broadly in subjecting the celluloid blank to the softening influence of moisture and heat, for example as by steaming, and then shaping the celluloid by pressure in forming dies upon the article to be covered. Preferably the celluloid is allowed to cool before the dies are separated but this is not essential to the method. It has been found that the method above outlined results in an improved product and also renders the shaping or forming operation more easily effected.

The construction of a preferred embodiment of the machine and the nature of the novel method will be best understood and appreciated from the following drawings, in which,—

Figure 1 is a view of the entire machine in side elevation; Fig. 2 is a plan view; Fig. 3 is a view in perspective of the blank supplying mechanism; Fig. 4 is a detail view showing a die in blank receiving position at the foot of one of the raceways; Fig. 5 is a view in elevation of the feeding and cutting mechanism for the celluloid rod; Fig. 6 is a view in perspective of the feeding mechanism shown in Fig. 5; Fig. 7 is a partial view in perspective of the cutting devices and the guideways for the celluloid rod; Fig. 8 is a sectional view of one of the press castings; Fig. 9 is a perspective view of the delivering end of the guideway and part of the carrier ring; Fig. 10 is a view in perspective of the mold pressing plunger; Fig. 11 is a fragmentary view in perspective of the press actuating mechanism; Fig. 12 is a sectional view of the mold cleaning device; Fig. 13 is a fragmentary view in perspective of part of the mold feeding mechanism; Fig. 14 is a fragmentary view in perspective of part of the guideway; Fig. 15 is a fragmentary view of the carrier ring and its feeding disk; Fig. 16 is a sectional view of the carrier ring and its supporting flange; Fig. 17 is a sectional view through the guideway for the molds, and Fig. 18 is a fragmentary view of the mold locating device adjacent to the delivery end of the guideway.

The operation of the machine will be best understood from a brief description of its general structure, with reference to the drawings, and of the manner in which its different instrumentalities coöperate. The machine has a horizontal heated guideway 2 along which is moved intermittently a series of molds 4 each having two pairs of coöperating dies and being each arranged to receive a pair of metal blanks from a pair of raceways 6 leading from hoppers 8 in which the blanks are contained in bulk. After the hook blanks have been supplied to the molds the latter are advanced a few steps and then a celluloid blank is delivered to each pair of dies. The molds have hook receiving or throat dies 10 pivoted to each side and arranged at times to stand in a vertical position and receive the hook blanks with their open sides down and barrels horizontal. Each mold has also two dies 12 shaped to form the outer part of the heads of the hooks and these dies are located in the bottom of the mold in such position as to register with the head of the hook when the throat or receiving dies 10 are folded into a horizontal position. The celluloid, in the form of a rod or wire, is fed from each side of the guideway through tubes 14, pieces being cut from the end of the rods in just the proper size to form the celluloid cover of the hooks and leave no waste, and one of these pieces is placed automatically in each of the lower or head dies 12. After the celluloid blanks have been so received the throat dies 10 are folded down upon the head dies and then the molds are advanced along the heated guideway 2. During their progress the celluloid is heated and moistened so that it is rendered sufficiently soft and plastic to be molded by pressure between the dies.

The guideway 2 is disposed diametrically of a large intermittently rotating carrier ring 18 having a plurality of recesses or sockets in its circumference and each shaped to receive a single mold. When a mold has reached the end of the guideway 2 it is pushed into a recess in the ring and carried thereby step-by-step circumferentially back to the other end of the guideway. When the mold has been carried one step by the ring it is automatically subjected to pressure and clamped under pressure by the plunger 20 (Figs. 8 and 9) which is forced downwardly and locked by an eccentric lever 22 actuated in turn by the arm 24 of the vertically reciprocating plunger 25. A curved wedge cam 26 serves to swing the levers 22 upwardly as they approach the end of the guideway so that pressure on the molds is released before this point is reached. When the ring 18 stops with a mold opposite the receiving end of the guideway the mold is pushed into the guideway by its corresponding ejector plate 28 actuated by the reciprocating slider 30. Wedge cams 32 on either side of the molds then swing the hook dies up into a vertical position with the finished hook thereon and other wedge cams 34 strip the hooks from the dies, whence they fall into chutes 36 and pass to a receptacle.

Having now briefly outlined the general operation of the machine its various parts and instrumentalities will now be more specifically described.

The frame of the machine comprises a heavy circular flange 100 supported at a convenient height by legs 101 and having integrally formed therewith the diametrical bars 102 and 103 disposed at right angles to each other. The bar 102 is grooved centrally to receive a guideway 2 for the molds which is chambered (see Fig. 17) and connected with a steam supply pipe 105 and an exhaust pipe 104 whereby it may be maintained at the proper temperature to soften the celluloid. A shaft 106 journaled in bearings on the frame beneath the bar 102 is arranged to actuate the moving parts of the machine and may be driven by a pulley 107 on one end from any suitable or convenient source of power.

A portion of the outer surface of the stationary flange is cut away to form a peripheral channel in which is journaled the rotatable carrier ring 18, see Fig. 16. The ring 18 has a projecting shoulder which extends downwardly on the outer edge of the flange 100 and flush with its lower surface. To this shoulder are rigidly attached the segments of another ring 108 having cut in its inner edge alternate radial slots 109 and segmental recesses. An adjustable roller bearing 99 for the ring is arranged on each leg of the frame.

The ring 18 is intermittently rotated and locked between each step by a pin 111 and segment 112 respectively mounted on a rotatable disk 113. The pin 111 first engages a slot 109 and advances the ring 18 one step while the cut away portion of the segment is turned toward the ring and then the curved portion of the segment engages the following segmental recess and locks the ring against movement until the pin is moved to act again. One disk 113 is located at each side of the ring and these disks are rotated simultaneously from the actuating shaft 106 through the two gears 115, transverse shafts 116, bevel gears 117, bevel gears 118 and vertical shafts 119 to the upper end of which are rigidly secured the disks 113. In the upper surface of the ring 18 are formed a series of radial slots each shaped at its inner end to receive a mold 4 and having an ejector plate 28 slidingly arranged in its outer portions, the tails of the plates projecting without the circumference of the ring 18. Radial movement of the ejector plates 18 is limited by a slot and pin connection, not shown.

The guideway 2 and the sockets or recesses in one side of the carrier ring 18 are kept full of molds, the line of molds being intermittently advanced along the guideway from the end at which they are received from the ring 18 to the end at which they are delivered. It is understood that when the ring is locked between each step there is one recess or socket in register with each end of the guideway 2. A mold is pushed into the guideway from the ring by the following mechanism:—A bracket 120 having a horizontal guideway in its upper surface is bolted to the under side of the bar 102 adjacent to the right side of the machine (Fig. 1) and in this guideway is slidingly mounted a plate 30 having a vertical stud 124 at its outer end located in longitudinal alinement with the guideway 2 and the path of the particular ejector 28 which happens to be in delivering position. The bracket has downwardly projecting ears in which is mounted an angle cam lever 126 engaging at its upper end in a slot in the slide plate 30 and having a roller 128 at its lower end which coöperates with a surface cam 130 on the shaft 106. It will be seen that when the cam lever 126 is swung outwardly at its lower end and the plate 30 moved inwardly, the stud 124 will engage and force inwardly the ejector 28 thus pushing the mold located in front of it from its recess in the carrier ring 18 into the receiving end of the guideway 2. It will be apparent that the whole line of molds will be advanced in the guideway 2 at the same time a distance equal to the width of one mold. Reverse movement of the cam lever 126 and slide plate 30 is caused by the action of a tension spring 132 extending between the lever 126 and a stationary bent arm 134 bolted or otherwise secured to the bracket 120.

In order to insure positively that a mold shall not project inwardly from its recess and strike the end of the bar 102 in moving into line with the guideway, there is provided within the ring 18 and adjacent to its inner edge, a guard 136 which acts positively, as the molds are moved relatively to it, to force each mold outwardly into its recess. In order that each ejector plate 28 may also be retracted there is provided an arm 138, see Fig. 13, on the upper end of the stud 124 and this arm carries a wedge cam 140 which acts successively upon each ejector through a stud 141 set in the latter. Under each ejector plate and recess is formed a channel inclining outwardly in the ring so that dirt, pieces of celluloid, or other obstruction will tend to fall out of the ring. This effect is assisted by a blast of air delivered intermittently from a pipe 142 as each channel comes into register with it.

The construction of the molds is well shown in Fig. 3. Each mold comprises a short bar having the upstanding ears 145 and flanges 144 at either end, the latter being shaped to fit undercut ways in the recesses of the carrier ring 18 and also in the sides of the guideway 2. The bar is beveled between the ears 145 and notched at its lower edges, the notches in two adjacent molds forming an opening leading to the bottom of the guideway 2.

Between each pair of ears 145 is pivoted a throat die 10 which is formed in a plate pivoted on a horizontal axis between its ends and has a rounded tail projecting outwardly from its pivot. The inner end of the plate is shaped to mold the celluloid covering properly about the inner surface and edges of the head of the hook blank. In the bottom of the mold are located the concave dies 12 before mentioned. These dies are formed on separate studs set in the bottom of the molds and have projecting portions 13 at their inner sides which shape the back of the head and neck of the hooks.

The hooks are supplied in pairs simultaneously to the hook dies of each mold while the mold is held in position below the lower end of the raceways 6. Projecting upwardly from the bar 102 is a yoke-shaped bracket 146, see Fig. 3, to which is attached a block 148 having three vertical guideways formed therein for two hook conveying plungers 149 and a mold locating plunger 150. A second bracket 152 secured to a block 94 supports the rear portion of said block 148. The lower ends of the raceways 6 are connected to the block 148 and pass one on each side of the rear bracket 152. Secured to the under side of the block 148 is a rectangular frame 154, see Fig. 4, of a width equal to the distance between the hinged hook dies when the latter stand in vertical position. The sides of the frame project below the top of the hook dies in the guideway 2 and the dies are pressed inwardly against the frame by leaf springs 156 as the molds are moved past the frame so that the lateral position of the hook dies is determined with accuracy. A horizontal guideway is formed in each side of the block 148 just above the tops of the hook dies and in line with the raceways. In this guideway are located a pair of plates 158 and 160 which are yieldingly held in contact at their proximate ends by springs 162 and 164 respectively. The upper adjacent corners of the plates 158 and 160 are cut away to form a depression or recess adjacent to the bottom of each raceway into which successive hooks pass from the raceway when released by the let-off mechanism. After a hook has been delivered to the recess at the upper edge of the plates 158 and 160 it is forced downwardly between these plates and seated on a hook die by the reciprocation of one of the conveying plungers 149, the plates yielding apart sufficiently to permit the passage of the hook but still preventing it from turning in transit. The conveying plungers 149 are connected at their upper ends to a plate 223 carried by a cross head 162 in such a manner as to permit a vertical yielding against the compression of springs 166 in case an imperfect hook or other obstruction is encountered.

Connected to the plate 223 on the cross head 162 between each pair of conveying plungers 149 is the forked mold locating plunger 150 also arranged for vertical yielding movement, similarly to the conveying plungers by the interposition of a spring between it and the plate 223 and having its operative end in advance of the ends of the conveying plungers 149. The cross head 162 is reciprocated through the side rods 168, the lower cross head 170, and the eccentric rod 172 by the eccentric 174 on the actuating shaft 106. When the cross head is moved downwardly the forked ends of the plunger 150 first engage the beveled sides of the mold, which has been advanced into approximate position, and shift the mold accurately into its proper hook receiving position. In its continued motion the cross head acts to compress the spring 151 thus holding the plunger forced against the mold and so locking the latter in position. The conveying plungers have meanwhile begun to act in the latter part of the stroke of the cross head; these carry the hook blanks to the hook dies and force them to their seats.

The frame 154 has grooves in its sides located behind the abutting ends of each pair of plates 158 and 160 to permit the passage of the head of a hook blank. The upper portion of each conveying plunger is square in cross section to fit its guideway in the block 148 but at its lower or hook engagement end it is provided with a flat blade 176 arranged to overlie the head of a hook blank, a reduced portion 178 arranged to fit into the depression in the back of the neck of the hook and a forked piece 180 arranged to engage the barrel of the hook. A vertical leaf spring 182 is secured at each side of the block 148 in position to engage the end of the barrel of a hook blank as it is delivered to the recess between the plates 158 and 160 to prevent the hook from being displaced. It will be seen that each hook is securely grasped and its position definitely controlled at every point in its passage from the recess to the hook die.

The hook blanks are supplied to the upper end of each raceway 6 from hopper 8 in which is arranged a rotatable separator plate of any desired construction. Pawl and ratchet mechanism is provided for rotating the separators and is driven from a crank disk 80 on the end of the shaft 106 through a connecting rod 82 and plunger 84 mounted for vertical reciprocation in bearings in the standard 86 which carries the hoppers 8.

The hook blanks descend the raceways 6 by gravity the lowermost hook being arrested by the pointed end of an arm 184 pivoted on the lower rail of each raceway. The arm 184 is connected with an oppositely arranged arm 186 pivoted on the upper rail of the raceway by means of a bridge piece 188. The end of the arm 186 is arranged to enter the space between the lowest two hooks on the raceway and prevent the whole line from passing down when the lower arm 184 is swung downwardly to permit the escape of the lowest hook. The arm 186 is formed as a bell crank lever and its upwardly extending arm has a pin and slot connection with a bell crank lever 190 pivotally mounted upon the sides of the block 148. The upper arms of each lever 190 are hooked and extend into the path of movement of a pin 90 set in the outer side of each transferring plunger 149, see Figs. 3 and 5, so that at each upward movement of the latter the one hook is released by the let-off arm 184. Reverse movement of the levers 190 and consequently the let-off arms is caused by a pair of spring plungers 192 each having a transverse pin 194 engaging the under side of the horizontal arm of one of the levers 190.

In order to provide a convenient means for rendering the let-off mechanism inoperative if desired, the vertical arms of the levers 190 are hinged and may be swung outwardly from the path of the cross head when desired. Pivoted locking pieces 196 are arranged to lock the arms of the levers 190 in alinement when in operation.

After a mold has been supplied with hook blanks as above outlined it is advanced to devices for supplying the celluloid blank required for covering the blanks. These devices will now be described. On either side of the guideway are arranged guiding tubes 200 which direct the celluloid in the form of a small rod or wire from coils, not shown, to the toothed feed wheels 202. The feed wheels are mounted upon short spindles 204 each journaled in bearings formed in a plate 205 adjustably mounted on a standard 206 bolted to the bar 102 and each spindle is provided at its outer end with a ratchet wheel 208 through which the spindle and its feed wheel is rotated step-by-step to advance the celluloid to the cutting off point.

The ratchet wheels are rotated simultaneously in opposite directions by dogs 210 each of which is pivoted to a segment 212 projecting upwardly from a sleeve 214 loosely mounted on the spindle 204. Projecting from the sleeve 214 in the rear of the segment is a roller arm 216 carrying a cam roller which coöperates with a cam 218 carried by a slider plate 220 arranged for vertical reciprocation in ways cut in the outer side of the standard 206 and connected by a rod 222 to the plate 223 on the cross head 162. When the cross head is elevated the cam 218 acts to throw the roller arms outwardly and swing the segments causing the dogs 210 to rotate the ratchet wheels. When the cross head and cam descend the tension spring 224 causes reverse movement of the roller arms and the dogs are carried idly over a tooth on each ratchet wheel. If it should be desired to throw the feed wheels out of operation the roller arms are pulled apart and locked out of the path of the cam by a latch 226 pivoted to one arm and having a notched end to engage a pin on the other arm.

A horizontal guideway or tube 14 of circular cross section for the celluloid is formed beneath each feed wheel, the latter being arranged to engage the stock between its teeth and the bottom of the tube, advancing it and indenting it at each intermittent movement. Each tube at its inner end intersects a vertical passage in which reciprocates a cutting plunger 230 connected at its upper end to the plate 223 and actuated by the reciprocation of the cross head 162. The rotation of the feed wheel advances the end of the celluloid rod across the vertical passage bringing its end into contact with the face of the central partition or abutment 232 between the two passages. The end of the rod is sheared off by the cutting plunger against the lower inner edge of the tube 14, being thereupon carried down the vertical passage and deposited in one of the concave dies. The ends of the vertical passages extend into close proximity to the dies so that there is no opportunity for the celluloid blank to become displaced.

The lower ends of the cutting off plungers 230 are inclined having their longer sides disposed toward the center of the machine and sharpened to form a cutting edge by being beveled on their inner sides. Adjacent to their longer sides each plunger has a rib 231, its thickness from back to front being slightly less than the diameter of the celluloid rod to be handled. A stationary leaf spring 234 is attached to the front of the standard 206 and has a finger pressed resiliently against the rib or reduced portion of each cutting plunger.

When the cutting plunger is forced downwardly the inclination of the cutting edge causes the celluloid rod to be forced toward the rear side of the vertical passage into alinement with the shoulder formed by the end of the reduced portion of the plunger and by this portion the celluloid blank is transferred past the leaf spring 234. When the blank passes this spring it snaps inwardly against the side of the reduced part 231 of the plunger and in so doing imparts an added downward impulse to the blank. It also acts as a stripper and prevents the plunger from carrying the blank upwardly from the concave die in case the blank should stick to the plunger.

After the molds have been supplied with celluloid blanks they are advanced along the guideway 2 under the cock 250 of a water pipe and a drop or two of water is allowed to fall into the V-shaped channel formed by the adjacent beveled sides of the molds, the water finding its way to the bed of the heated guideway through the apertures formed by adjacent notches before mentioned. This water is carried along by the molds, being vaporized in its passage along the guideway and acting to soften the celluloid and render it fit for molding. After passing the cock 250 the molds pass under a pair of wedge cams 254 which engage and fold inwardly the hook dies carrying with them the hook blanks which are lowered into place upon the celluloid blanks in the concave dies, although no pressure is applied at this time. Guides 256 are disposed adjacent to the cams 254 being shaped to fit in the groove in the back of each hook blank and run in said groove while the hook die is being folded inwardly and at the same time being advanced. The shape of the guard therefor approximates a helix. After the molds pass the cams 254 they traverse the remaining length of the guideway 2 and the celluloid is heated meanwhile. After the hook dies have been folded in on the concave dies the hook barrels project vertically. They then travel along the outer edges of a bar 260 suspended from bridges over the center of the guideway 2 and having a tapering end to guide the barrels outwardly so as to seat the blanks firmly on their dies. The body of the bar holds the blanks in this position and also prevents the hook dies from tilting upwardly in their passage along the raceway.

In order to form in effect a steam chamber where the celluloid may be subjected to the softening influence of the steam generated by the water dripped from the cock 250 on the heated guideway 2 there are provided sheet metal covers 40 which extend above the molds in the guideway, as shown in Fig. 17. A small portion only of one of these covers is shown in Fig. 2 in order to leave the guideway visible. In practice these covers extend longitudinally of the guideway from adjacent to the cock 250 to the delivery end of the guideway. They are preferably made removable so as to effect ready access to the guideway.

When a mold has been advanced to the end of the guideway 2 the next step takes it into the recess in the carrier ring and it then begins its circumferential journey to the other end of the guideway 2. In making its first circumferential step the mold is carried past a spring pressed plate 264 with a curved outer end which acts to press the mold outwardly into its seat and insure its proper location before it is subjected to pressure, see Figs. 1 and 18.

Bolted to the upper surface of the carrier ring is a series of press castings 270, each extending over two adjacent radial slots and recesses and having a pair of vertical bores in which are located the pressing plungers 20, see Fig. 8. Each plunger is located above the dies of the mold in the recess into which the bore of the plunger opens and the plunger has a pair of holes drilled into its lower end, see Fig. 10, to receive the barrels of the blanks held in these dies. Adjacent to each hole is a projection 274 shaped to fit into the groove in the back of each hook blank and prevent the celluloid from spreading down this groove and also to form a square shoulder in the applied celluloid at the proper point. Above the plunger 20 may be located a stiff compression cushion of any preferred form. As herein shown this comprises a head 275, a stiff compression spring 276 and a loose washer 278 held in position to keep the spring under considerable pressure by a bolt 280 threaded into the head 275. The head of the bolt 280 is received in a hole in the upper end of the plunger 20 when the cushion is subjected to pressure and thereby contracted. A lever 22 is pivoted between ears on the press casting and has a hardened eccentric portion 284 arranged to engage and depress the head 275 and thereby force down the plunger 20 when the lever is swung into a position inclined downwardly toward the center of the carrier ring.

Each plunger 20 is normally maintained in its highest position by a compression spring 285 which acts against one end of a transverse pin 286 projecting through the plunger 20. The other or inner end of the pin 286 projects through a slot in the press casting 270. As each press is being advanced into line with either end of the guideway the end of the pin 286 encounters an inclined guard 288 which will act positively to elevate the pin 286 and its plunger in case one of the springs 285 should become broken or the plunger remain in its lower position for any other cause.

Each lever 22 is swung into its position of pressure when it is at rest after making its first circumferential step from the delivery end of the guideway 2. To this end a plunger 25 is arranged to reciprocate vertically in bearings formed in a casting bolted to the bar 102 and is provided with an outward extending arm 24. An angle contact plate 296 is slidingly fitted in ways in the under side of the arm 24 and yieldingly held in its outer position by a spring 297. As the end of the lever is swung downwardly the contact plate is moved inwardly on the arm by the engagement of the lever with a flange on the plate and the final downward movement of the lever is effected by the engagement of another flange on the edge of the plate with the lever. This construction results in a longer driving stroke than would be possible with a flat arm alone. The plunger 25 is reciprocated from a short counter shaft geared to the actuating shaft 106 and having a crank disk 300 and crank rod 302, shown in Fig. 1.

After the molds leave the point at which they are subjected to pressure they are conveyed by the carrier ring 18 in an intermittent manner along a path extending for about one third of its circumference, being cooled while under pressure in their movement along this path. Before each mold arrives at the receiving end of the guideway 2 its pressing lever 22 is moved into engagement with a curved wedge shaped unlocking cam 26, see Figs. 1 and 2, and is swung upwardly thus relieving the pressure on the mold. The guard 136, before mentioned, extends from the point at which each mold is unlocked to the receiving end of the guideway 2 and prevents displacement of a mold from its socket after it has been released from pressure. A plunger lifting safety guard 137, similar to the guard 288, above described is located adjacent to the receiving end of the guideway and serves to positively lift each plunger 20 by its pin 286 in case of the failure of the lifting spring 285.

When a mold has been brought into register with the receiving end of the guideway 2 the slider 30 is actuated to push it into the guideway in the manner already explained. On either side of the guideway adjacent to its receiving end are disposed blocks 32 having downwardly inclined cam surfaces arranged to engage the outer ends of the throat dies 10 as each mold is advanced and swing the dies in a vertical position with the finished hooks on them.

In the rear of the blocks 32, as shown in Fig. 3, are disposed other blocks 42 having upwardly inclined hook stripping surfaces and these surfaces, coöperating with similarly inclined surfaces 34 on a plate 44 located directly over the path of the molds and between the vertically disposed throat dies, act to remove the completed hooks which are then free to fall into chutes 36 whereby they may be conducted to any convenient receptacle beneath the machine. The blocks 42 and 44 form a narrow channel through which the throat dies must pass and a curved spring wiper or stripper 46 is arranged above the path of the throat dies to further assist in the stripping operation and in clearing the dies of bits of celluloid which might cling to their upper edges. In passing between the blocks 42 and 44 the dies 10 are positively held in their vertical position and advanced in this position to the foot of the raceways 6 where new hook blanks are supplied.

In advancing from the position in which the finished hooks are stripped from the dies to the raceways each mold passes beneath a brush 96 set in the plate 94, see Fig. 12, adjacent to a receptacle 98 which is kept full of mold oil. Small oil ducts extend from the receptacle to the brushes and in passing under the brushes the dies are cleaned and oiled preparatory to receiving fresh blanks.

The term "mold" as used herein should be construed broadly to cover any coöperating forming dies, or any set of coöperating forming dies, the specific example herein shown being the member designated by reference character 4, Fig. 3, which comprises two pair of coöperating dies and their mounting.

Having now fully described my invention what I claim as new and desire to secure by Letters Patent of the United States is:—

1. A machine of the class described having, in combination, a pair of coöperating dies, means for feeding a metallic blank to the dies, means for feeding a plastic blank to the dies, and means for advancing intermittently both dies of said pair to bring them into position to receive first one blank and then into position to receive the other of said blanks.

2. A machine of the class described having, in combination, a series of movable coöperating pairs of dies, and automatic means for supplying a metallic blank and a plastic blank simultaneously to the dies of two different pairs.

3. A machine of the class described having, in combination, a pair of coöperating dies movable in an endless path, means for moving the dies intermittently in said path and means for successively supplying to the dies between movements thereof in said path a metallic blank and a plastic blank.

4. A machine of the class described having, in combination, a pair of coöperating dies movable in an endless path, and means for successively supplying to the dies between movements thereof in said path a metallic blank and a plastic blank and for subsequently subjecting said dies to pressure.

5. A machine of the class described having, in combination, a pair of coöperating dies movable in an endless path, and means for successively supplying to the dies between movements thereof in said path a metallic blank and a plastic blank, for subsequently subjecting said dies to pressure, and for releasing the pressure on the dies.

6. A machine of the class described having, in combination, a pair of coöperating dies movable in a predetermined path, means for supplying the dies with blanks, and a heated chamber through which the dies are passed during a portion of their movement along said path.

7. A machine of the class described having, in combination, a pair of coöperating dies movable in a predetermined path, means for supplying the dies with blanks, heating means for the dies, and means for subjecting the dies to pressure after they have passed beyond said heating means.

8. A machine of the class described having, in combination, a pair of coöperating movable dies, means for directing movement of said dies in a substantially straight path from one point to another in the machine, means for heating the dies in said path, means for subjecting the dies to pressure, and means for directing subsequent movement of the dies under pressure in a relatively longer curved path to cool the dies.

9. A machine of the class described having, in combination, a pair of coöperating movable dies, means for directing movement of said dies first in a straight path and then in a relatively longer curved path, means for supplying blanks to the dies while they are located in one of said paths, and means for subjecting the dies to pressure in the other path.

10. A machine of the class described having, in combination, a mold having two pairs of dies therein, means for supplying a metallic blank to one die of each pair, means for supplying the plastic blanks simultaneously to both pairs of dies, and means for moving the molds along an extended path wherein they are heated, subjected to pressure and subsequently cooled.

11. Mechanism for delivering a hook blank to a forming die comprising a pair of guide plates yieldingly held end to end above the die, and a transferring plunger arranged to reciprocate in line with the proximate ends of said plates and having a reduced portion arranged to pass between the ends of the plates and enlarged portions arranged to pass at each side of the plates.

12. In a machine for covering hook blanks, the combination with a forming die, of a conveying member arranged to carry a hook blank with its barrel held transversely to said die and having a forked portion for engaging the barrel of the hook and a flat blade arranged to fit over the top of the head of the hook.

13. A machine of the class described having, in combination, a guideway arranged to receive a plurality of forming dies extending in a series longitudinally thereof, means for moving the series of dies intermittently along the guideway, automatic means for supplying blanks to the successive dies, and a movable carrier arranged to receive the dies as they are delivered from the end of the guideway.

14. A machine of the class described having, in combination, a heated guideway, a series of molds comprising relatively movable coöperating dies movable along and out of the guideway, and an unheated carrier disposed adjacent to the guideway for receiving the molds one by one from the guideway.

15. A machine of the class described having, in combination, a guideway, a series of molds comprising relatively movable coöperating dies along the guideway, and a carrier extending from one end of the guideway to the other and arranged to receive successive molds from one end and convey them to the other end of the guideway.

16. A machine of the class described having, in combination, a heated guideway, a series of molds comprising relatively movable coöperating dies in the guideway, means for sliding the molds intermittently along the guideway, and means for bodily carrying the mold ejected at one end and reintroducing it at the other end of the guideway.

17. A machine of the class described having, in combination, a stationary circular flange, a movable carrier ring having sockets and being mounted for turning movement on said flange, and means for feeding forming dies to the sockets of said ring at one point in its periphery and ejecting them at another.

18. A machine of the class described having, in combination, a stationary circular flange, a rotatable carrier ring mounted on the flange and having portions shaped to fit upon the upper and lower surfaces of the flange and also upon its outer edge, and means for feeding forming dies to the carrier ring.

19. A machine of the class described having, in combination, a frame comprising a circular flange and a diametrically arranged bar, a guideway in said bar, a series of dies in said guideway, and a carrier ring journaled upon the flange and arranged to receive successive dies from the guideway.

20. A machine of the class described having, in combination, a rotatable carrier ring, a support for the ring, means for feeding dies to the ring, and actuating means acting upon the ring at its opposite sides for turning the ring in a step-by-step manner.

21. A machine of the class described having, in combination, a ring having sockets, a guideway leading to the ring, actuating means for relatively turning the ring and guideway to bring successive sockets of the ring into register with the guideway, and means for holding the ring and guideway in such position.

22. A machine of the class described having, in combination, a ring having sockets, a line of forming dies extending into proximity to the ring, and means acting upon the most remote dies of the line for advancing the proximate die into a socket of the ring.

23. A machine of the class described having, in combination, a frame having a guideway and a flange, a rotatable carrier ring arranged to turn on the flange, means for feeding forming dies to and from the carrier, means for intermittently rotating the carrier ring, and adjustable bearing rollers arranged at separate points beneath the carrier ring.

24. A machine of the class described having, in combination, a guideway having therein a series of forming dies, a carrier ring surrounding said guideway, and a single device for ejecting one die from the guideway and introducing another die into the guideway.

25. A machine of the class described having, in combination, a mold, means operating always in the same direction for feeding a celluloid rod into position adjacent to the mold, and means for cutting a section from the celluloid rod and delivering it to the mold, said feeding means having provision for advancing the rod a distance substantially equal to the length of the section to be severed therefrom.

26. A mold for a hook covering machine comprising a support having a concave die set therein, and a throat die hinged to said support to permit movement from a vertical receiving position to a horizontal molding position.

27. A machine of the class described having, in combination, a mold comprising a horizontally disposed die and a coöperating die movable about a horizontal axis, and positive automatic means for turning the latter die in both directions about its axis.

28. A machine of the class described having, in combination, a mold comprising a horizontally disposed die, a coöperating die movable about a horizontal axis, means for automatically swinging the movable die into receiving position, means for feeding a blank to said movable die while in such receiving position, and means for swinging said die into pressing position.

29. A machine of the class described having, in combination, a mold comprising a pair of dies one of which is hinged, means for feeding a flanged metal blank to the mold with its flange in a predetermined relation to the mold, and means acting automatically to swing said hinged die toward or from the other die and to apply pressure to the hinged die.

30. A machine of the class described having, in combination, an inclined raceway for hook blanks, a mold having a hinged throat die movable in a path adjacent to the delivery end of said raceway, means for transferring a hook blank from the raceway to the throat die while the throat die is in one position and then for swinging the throat die into another position.

31. A machine of the class described having, in combination, a pair of coöperating dies one of which is hinged, means for feeding a hook blank to the hinged die and seating it upon the die with its barrel held horizontally, and means for swinging said die to bring the barrel of the hook blank into a vertical position.

32. A machine of the class described having, in combination, a raceway for hook blanks, a die shaped to receive the throat of a hook blank and arranged for movement relatively to the raceway, means for guiding the die in the plane of and beneath the raceway, and plates disposed between the path of the die and the raceway, said plates being yieldable to permit the passage of a hook from the raceway to the die.

33. A machine of the class described having, in combination, a die, means for feeding a celluloid rod into a position adjacent to the die, and automatic means for cutting a piece from the end of the celluloid rod and delivering it to the die, said cutting means comprising a knife formed on the side toward the feeding means with a plane surface extending to its cutting edge.

34. A machine of the class described having, in combination, a series of dies movable in a horizontal path, means for feeding a celluloid rod into position above the path of the dies, and means for cutting pieces from the end of the celluloid rod and delivering the pieces so cut to the dies in a path transverse to the path of movement of the dies.

35. A machine of the class described having, in combination, a guideway, a series of molds in said guideway, a guideway for a celluloid rod, an abutment oppositely disposed to the delivering end of the latter guideway, intermittent feeding means for advancing the celluloid rod into contact with the abutment, severing means spaced from the abutment and arranged to act upon the rod, and means for moving the series of molds to bring them successively into position to receive the pieces cut from the rod.

36. A machine of the class described having, in combination, a mold, a guideway for a celluloid rod having an open side, a feed wheel disposed in the opening of the guideway arranged to engage the rod between itself and the opposite side of the guideway to advance the rod toward the mold.

37. A machine of the class described having, in combination, a coöperating pair of forming dies one of which is hinged, means for feeding a celluloid rod to a position adjacent to one of said dies, means for severing and delivering to said die a piece from the end of the rod, and means for swinging the other die to cover the piece after it has been so delivered.

38. A machine of the class described having, in combination, guiding means for a celluloid rod, and a feed wheel for advancing the rod through the guiding means arranged for adjustment to accommodate rods of different dimensions.

39. A machine of the class described having, in combination, a reciprocatory cross-head carrying a feeding cam and severing knife, a feed wheel, and a guideway for a celluloid rod, the feed cam actuating the feed wheel to advance the celluloid rod into the path of the severing device during the movement of the cross-head in one direction.

40. A machine of the class described having, in combination, a reciprocatory severing device, a feed wheel for moving a celluloid rod into the path of said device, actuating means, and connections whereby the feed wheel is rotated during retracting movement of the severing device.

41. A machine of the class described having, in combination, a pair of oppositely disposed guideways for celluloid rods, a common abutment in line with the axis of the guideways, means for simultaneously advancing the rods into contact with the opposite faces of the abutment, and means for simultaneously severing the ends of said rods.

42. A machine of the class described having, in combination, a mold comprising a pair of dies one of which is hinged, means for automatically delivering a plastic blank to the unhinged die while the hinged die is swung away from it, separate means for delivering a metallic blank to the mold and automatic means acting thereafter to swing the hinged die into proximity to the unhinged die.

43. A machine of the class described having, in combination, a mold comprising a pair of forming dies one of which comprises a plate pivoted between its ends, and means acting on said plate at opposite sides of its axis for swinging it first in one direction and then in the other.

44. A machine of the class described having, in combination, a mold, means for feeding a celluloid rod toward the mold, comprising a feed wheel arranged for continuous engagement with the rod and means for cutting from the celluloid rod a piece of suitable size to be shaped by the mold.

45. A machine of the class described having, in combination, a mold for shaping a celluloid blank, means for feeding a celluloid rod toward the mold, and severing means comprising a curved support beyond which the end of the rod is projected and a reciprocating knife having a straight side toward the support and being beveled upon its opposite side to form a cutting edge.

46. A mold for a hook covering machine comprising a concave head die, a throat die, and a member 20 movable independently of the head and throat dies to apply pressure thereto and having a die element 274 for shaping the covering of part of the neck of a hook.

47. A machine of the class described having, in combination, a guideway for a celluloid rod, a transversely operating severing device having an inclined cutting blade and a transferring shoulder located adjacent to one end of said blade.

48. A machine of the class described having, in combination, a heated guideway for a series of molds, means for supplying metallic and celluloid blanks to the molds, and means for supplying water to the surface of the heated guideway.

49. A machine of the class described having, in combination, a heated guideway for a series of molds, means for advancing the molds along the guideway, and means for supplying water to the surface of the heated guideway between the molds.

50. A machine of the class described having, in combination, molds movable in a fixed path, automatic means for delivering blanks to the molds, at a predetermined point in said path a chamber containing steam, and means for passing the molds so supplied into said chamber.

51. A machine of the class described having, in combination, relatively movable mold parts for shaping celluloid, means for heating and moistening the mold and celluloid therein, said mold being movable into and out of range of the heating means, and automatic means for applying pressure to the mold parts to force them together.

52. A machine of the class described having, in combination, a stationary support for a mold, a movable carrier having a plurality of pressing plungers, means for feeding a mold from the stationary support into alinement with one of said plungers, and means for depressing the plunger to subject the mold to pressure.

53. A machine of the class described having, in combination, a stationary support for a plurality of molds, a movable carrier having a plurality of pressing plungers and actuating means for the plungers, and means for feeding successive molds from the stationary support into alinement with the different plungers, said actuating means being automatically operated to effect pressing movement of successive plungers.

54. A machine of the class described having, in combination, a stationary guide way for a series of molds, a movable carrier having a plurality of pressing plungers, one arranged to act upon each mold delivered to the carrier an actuating lever for each plunger, and automatic means for effecting a pressing movement of each lever.

55. A machine of the class described having, in combination, a mold, a guideway for a celluloid rod, means for cutting a piece from the rod, a transferring device movable toward the mold to convey the severed piece, and spring means for imparting an impulse in the direction of the mold to the piece.

56. A machine of the class described having, in combination, a movable carrier having sockets formed therein and a pressing plunger arranged for movement in alinement with each of said sockets, means for feeding a mold into a socket, and positively acting means for elevating the pressing plunger prior to the introduction of a mold.

57. A machine of the class described having, in combination, a movable carrier having a pressing plunger and a socket for a mold, a reciprocatory actuating device, and connections between the plunger and actuating device constructed and arranged to impart to the plunger movement of different extent from that of the actuating device.

58. A machine of the class described having, in combination, a mold, a pressing plunger arranged to act upon the mold, a lever for moving the plunger and a reciprocatory actuating device arranged to swing the lever through an arc longer than its own stroke.

59. A machine of the class described having, in combination, a stationary mold delivering device, a movable carrier having sockets for a plurality of molds, a pressing member disposed adjacent to each socket, and an actuating device arranged to act upon successive pressing members as they are moved into operative position by the carrier.

60. A machine of the class described having, in combination, a horizontally movable carrier for a plurality of molds, a pressing member for each mold movable with the carrier, and a vertically reciprocatory actuating device arranged to act automatically upon successive pressing members as they are brought into register therewith.

61. A machine of the class described having, in combination, a mold container, a vertically movable pressing member in the container, a lever for operating said member and a vertically reciprocatory actuating device having a horizontally movable contact piece for engagement with said lever.

62. A machine of the class described, having, in combination, a mold, guiding means for a celluloid rod, a knife arranged to sever a piece from the rod, a conveying plunger of less thickness than the severed piece, and a spring stripper bearing against the side of the plunger and past which the piece is forced by the plunger.

63. A machine of the class described having, in combination, a movable carrier having a socket to receive a mold, and a yielding member located adjacent to the path of the carrier and arranged to force the mold into its socket as the carrier conveys the mold past it.

64. A machine of the class described having, in combination, a movable carrier, means for feeding a mold to the carrier, means for subjecting the mold so delivered to pressure, and a mold locating device arranged to act on the mold at a point between said feeding means and said pressing means.

65. A machine of the class described having, in combination, a movable carrier having a series of pressing levers, a reciprocatory device for swinging successive levers into position of pressure, and a stationary device for swinging the levers to release them as they are moved relatively thereto by the carrier.

66. A machine of the class described having, in combination, a movable carrier having a pressing lever, and relatively movable mold parts and a member having an inclined cam surface for swinging the lever in one direction as the lever is moved past it by the carrier.

67. A machine of the class described having, in combination, a movable carrier having a socket for a mold and a pressing lever, separate means for moving the lever in opposite directions, and means acting to prevent displacement of a mold prior to the movement of the lever in one direction and subsequent to its movement in the other direction.

68. A machine of the class described having, in combination, a guideway for a line of molds, a slide arranged for reciprocation in a path parallel to but out of line with the guideway and having a feeding member extending into alinement with the guideway, and a pusher operated by said feeding member for moving the line of molds along the guideway.

69. A machine of the class described having, in combination, a movable carrier having a series of sockets for molds and an ejector for each socket, a reciprocatory actuator, and means for moving said carrier to bring successive ejectors into operative relation to said actuator.

70. A machine of the class described having, in combination, a driving shaft, a movable carrier having sockets for molds, separate devices for supplying molds to said sockets and for pressing upon the molds, and connections whereby said devices are operated from the driving shaft.

71. A machine of the class described having, in combination, a driving shaft, a movable carrier for molds, a device for intermittently moving the carrier, a device for feeding molds to the carrier, and connections whereby said devices are operated by the driving shaft.

72. A machine of the class described having, in combination, a guideway for a line of molds having separate dies, cams adjacent to the guideway for positively moving said dies apart, and strippers for engaging and removing the finished articles from the separated dies.

73. A machine of the class described having, in combination, a guideway for a plurality of molds each having a movable die, die guiding means located adjacent to said guideway, and stripping devices adjacent to said die guiding means for engaging and removing the finished articles from the molds.

74. A machine of the class described having, in combination, a mold, means for supplying the mold with fresh blanks, means for ejecting the finished article from the mold, and means acting between the supplying and ejecting operations for oiling the mold.

75. A machine of the class described having, in combination, a mold movable in a fixed path, and means acting at successive points in its path to supply it with fresh blanks, eject the finished article and oil the mold.

76. A machine of the class described having, in combination, a guideway for a series of movable molds, means for supplying blanks to the molds, and means for engaging and holding in position each mold after it has been moved into receiving position.

77. A machine of the class described having, in combination, a guideway for a series of movable molds, a plunger for transferring successive blanks to the molds, and a mold centering device movable with the transferring plunger.

78. A machine of the class described having, in combination, a movable mold, blank delivering means, and a device associated therewith for properly locating the mold relatively to the delivering means.

79. A machine of the class described having, in combination, a reciprocatory cross-head, a hook transferring plunger mounted thereon, a forked mold locating plunger also mounted on the cross-head and having its effective end in advance of the transferring plunger, and yielding connections between the cross-head and the mold locating plunger.

80. A machine of the class described having, in combination, a heated guideway for molds, means for supplying water to the guideway, and covering devices forming a chamber about the molds in the guideway.

81. A machine of the class described having, in combination, a movable carrier having a series of sockets for molds, and an ejecting device disposed in alinement with each socket and being movable in the carrier to eject a mold from its socket.

82. A machine of the class described having, in combination, a movable carrier having a series of sockets for molds, and a pipe arranged to deliver a cleaning blast to each socket as the socket is brought by the carrier into register with the pipe.

83. An organized machine of the class described having, in combination, mold feeding means, hook blank feeding means, means for supplying plastic material to the molds, means for applying pressure to the mold after it has been supplied, means for releasing the pressure on the mold, and means for ejecting the finished hooks from the mold.

84. An organized machine of the class described having, in combination, mold feeding means, means for supplying blanks to the mold, means for steaming the mold after it has been supplied, means for pressing the mold after it has been steamed, releasing means, ejecting means operating subsequently to the releasing means, and mold cleaning devices operating subsequently to the ejecting means.

85. An organized machine of the class described having, in combination, a guideway for molds, a raceway leading to a point adjacent to the guideway, let off mechanism associated with the guideway, a reciprocatory head, a movable mold locating device, and connections between the head and the let off mechanism and locating device, respectively, whereby movement of the head in one direction renders the locating device operative and movement in the other direction operates the let off mechanism.

86. An organized machine of the class described having, in combination, a mold, a raceway for supplying blanks to the mold having let off mechanism for controlling the delivery of the blanks, and a reciprocatory transferring device connected to and arranged to control the let off mechanism, said device being movable toward the mold for advancing the blank thereto from the end of the raceway.

87. A machine of the class described having, in combination, a movable mold having a hinged die, means for swinging the hinged die from one position to another as the mold is moved, and stationary means for preventing displacement of an article held by the die.

88. A machine of the class described having, in combination, a mold having a hinged die to receive a hook blank, means for swinging the die with a blank thereon from one position to another, and a curved guard arranged to engage the back of the hook in each position of the hinged die.

89. A machine of the class described having, in combination, a reciprocatory head, a feeding device for a celluloid rod, a cutting off tool arranged to act upon the rod, and connections whereby movement of the head in one direction actuates the feeding device and in the other causes the operation of the cutting off tool.

90. The method of covering articles with celluloid which consists in advancing a celluloid rod into proximity to a mold containing the article to be covered, cutting from the rod a piece of sufficient size to form the covering, heating the article and the celluloid piece so formed, and then molding the celluloid piece upon the article.

91. The method of covering articles with celluloid which consists in subjecting a celluloid blank to moisture and heat during a predetermined interval, then discontinuing the heating, and finally molding the blank upon the article to be covered.

92. The method of covering articles with celluloid which consists in depositing a celluloid blank in one of a pair of coöperating dies, surrounding the die with water vapor at a high temperature, intermittently advancing the dies through the heated water vapor and then pressing the blank into shape between the dies.

93. The method of covering articles with celluloid which consists in depositing a celluloid blank in one of a pair of coöperating dies, advancing the dies over a heated surface and simultaneously depositing a limited quantity of water on said heated surface, thus generating steam which surrounds and softens the blank, and finally subjecting the softened blank to the shaping action of the dies.

94. The method of covering articles with celluloid which consists in supplying a celluloid blank to a pair of coöperating dies, advancing said dies through a passageway partially filled with steam at atmospheric pressure, and finally shaping the blank between said dies.

95. The method of covering articles with celluloid which consists in depositing a celluloid blank in position between coöperating dies, sliding the dies over a heated surface, subsequently applying pressure to the dies, and then carrying them bodily with material held under pressure a distance sufficient to permit the dies to cool.

96. The method of covering articles with celluloid which consists in moving dies to which a celluloid blank has been supplied through a chamber containing water vapor at high temperature, subjecting the dies to pressure, and then carrying them, while under pressure, along an extended path to cool the dies.

97. A machine of the class described including a raceway for hooks, a hinged hook holding plate arranged to stand normally in position to receive a hook from the raceway with its barrel held horizontally, and means for swinging said plate to bring the barrel of the hook into a vertical position.

In testimony whereof I have signed my name to this specification in the presence of two subscribing witnesses.

WILLIAM H. KINGSTON.

Witnesses:
FRANKLIN R. JOHNSON,
HERBERT W. KENWAY.

Copies of this patent may be obtained for five cents each, by addressing the "Commissioner of Patents, Washington, D. C."

It is hereby certified that in Letters Patent No. 1,164,821, granted December 21, 1915, upon the application of William H. Kingston, of New Haven, Connecticut, for an improvement in "The Manufacture of Celluloid-Covered Articles," errors appear in the printed specification requiring correction as follows: Page 9, line 94, claim 15, before the word "along" insert the word *movable;* page 11, line 113, claim 50, after the word "molds" strike out the comma; same page and claim, line 114, after the word "path" insert a comma; page 12, line 18, claim 54, after the word "plungers" strike out the comma; same page and claim, line 20, after the word "carrier" insert a comma; and that the said Letters Patent should be read with these corrections therein that the same may conform to the record of the case in the Patent Office.

Signed and sealed this 18th day of April, A. D., 1916.

[SEAL.]

Cl. 18—37.

R. F. WHITEHEAD,
*Acting Commissioner of Patents.*